United States Patent
Yang

(10) Patent No.: US 8,670,248 B2
(45) Date of Patent: Mar. 11, 2014

(54) PRIMARY-SIDE CONTROLLED POWER CONVERTER WITH AN RC NETWORK AND METHOD THEREOF

(75) Inventor: Ta-Yung Yang, Mulpitas, CA (US)

(73) Assignee: System General Corporation, Taipei Hsien (TW)

( * ) Notice: Subject to any disclaimer, the term of this patent is extended or adjusted under 35 U.S.C. 154(b) by 155 days.

(21) Appl. No.: 13/183,868

(22) Filed: Jul. 15, 2011

(65) Prior Publication Data

US 2012/0170326 A1 Jul. 5, 2012

Related U.S. Application Data

(60) Provisional application No. 61/428,105, filed on Dec. 29, 2010.

(51) Int. Cl.
*H02M 3/335* (2006.01)

(52) U.S. Cl.
USPC .................. 363/21.16; 363/21.08; 363/21.12

(58) Field of Classification Search
USPC ............... 363/21.08, 21.09, 21.12–21.18, 40, 363/131, 97
See application file for complete search history.

(56) References Cited

U.S. PATENT DOCUMENTS

| | | | | |
|---|---|---|---|---|
| 7,054,170 B2* | 5/2006 | Yang et al. | ................ | 363/21.18 |
| 7,649,755 B2* | 1/2010 | Kogel et al. | ................ | 363/21.12 |
| 7,768,802 B2* | 8/2010 | Lee et al. | ................ | 363/21.16 |
| 8,164,928 B2* | 4/2012 | Lin et al. | ................ | 363/21.16 |
| 2008/0123372 A1* | 5/2008 | Yang | ........................ | 363/21.16 |
| 2011/0051472 A1* | 3/2011 | Zhang et al. | ............... | 363/21.18 |
| 2012/0170326 A1* | 7/2012 | Yang | ........................ | 363/21.12 |

\* cited by examiner

*Primary Examiner* — Timothy J Dole
*Assistant Examiner* — Ivan Laboy Andino
(74) *Attorney, Agent, or Firm* — Bacon & Thomas, PLLC

(57) ABSTRACT

This invention provides a primary-side controlled power converter comprising: an RC network coupled to an auxiliary winding of a transformer of the primary-side controlled power converter to detect a reflected voltage of the transformer for generating a reflected signal, and a controller coupled to the RC network to receive the reflected signal for generating a switching signal; wherein the RC network develops a zero to provide a high-frequency path for shortening a rising time and a settling time of the reflected signal.

11 Claims, 5 Drawing Sheets

PRIMARY-SIDE CONTROLLED POWER CONVERTER WITH AN RC NETWORK AND METHOD THEREOF

BACKGROUND OF THE INVENTION

1. Field of the Invention

The present invention relates to a power converter, and more particularly, to a primary-side controlled power converter with an RC network.

2. Description of Related Art

Pulse Width Modulation (PWM) technique is widely used in power converters to regulate output voltage to an appropriate level. In order to reduce the number of elements in the power converter and dispense with a secondary-side feedback circuit, a primary-side control technique has been developed. To achieve the primary-side control, a reflected voltage on an auxiliary winding of a transformer can be sensed for voltage feedback control. However, the reflected voltage sensed on the auxiliary winding is not as accurate as a signal sensed directly on the secondary-side of the power converter. Moreover, high-frequency noise and ringing exist in the reflected voltage.

FIG. 1 shows a circuit diagram of a conventional primary-side controlled power converter. The primary-side controlled power converter comprises a transformer 10 including a primary winding $N_P$, a secondary winding $N_S$, and an auxiliary winding $N_A$. An anode of a rectifier 40 is coupled to the auxiliary winding $N_A$. One terminal of a storage capacitor 45 is connected to a cathode of the rectifier 40. The other terminal of the storage capacitor 45 is connected to ground. A switching controller 100 is coupled to sample a reflected voltage $V_A$ of the auxiliary winding $N_A$ of the transformer 10 through a low-pass filter. The low-pass filter includes resistors $R_A$, $R_B$ and a capacitor $C_2$. The resistor $R_A$ is connected to the auxiliary winding $N_A$ to receive the reflected voltage $V_A$. The capacitor $C_2$ is connected to a join of the resistors $R_A$ and $R_B$. The capacitor $C_2$ is used for filtering noises and providing a path with low impedance for EMI. A reflected signal $V_S$ is generated at a join of the capacitor $C_2$, the resistor $R_A$, and the resistor $R_B$ and received by the switching controller 100. The switching controller 100 generates the switching signal $S_W$ based on the reflected signal $V_S$ to switch the transformer 10 by switching a power transistor 20. When the power transistor 20 is turned off and the switching signal $S_W$ is during an off-time period, the reflected voltage $V_A$ is generated accordingly. The waveforms of the switching signal $S_W$ and the reflected signal $V_S$ are shown in FIG. 2. The transfer function of the reflected signal $V_S$ and the reflected voltage $V_A$ can be expressed as follows:

$$\frac{V_S}{V_A} = \frac{Z_2}{R_A + Z_2} \quad (1)$$

$$= \frac{\frac{R_B}{1+SR_BC_A}}{R_A + \frac{R_B}{1+SR_BC_A}}$$

$$= \frac{R_B}{R_A + R_B + SR_AR_BC_A}$$

$$= \frac{R_B}{R_A + R_B} \times \frac{1}{1+S\frac{R_A \times R_B}{R_A + R_B}C_A}$$

$$\frac{V_S}{V_A} = \frac{R_B}{R_A + R_B} \times \frac{1}{1 + j\left(\frac{f}{f_A}\right)} \quad (2)$$

$$f_A = \frac{1}{2\pi \times \left(\frac{R_A \times R_B}{R_A + R_B}\right) \times C_A} \quad (3)$$

where the frequency $f_A$ is a pole of the transfer function of the reflected signal $V_S$ and the reflected voltage $V_A$. When the switching signal $S_W$ changes from high level to low level and the power transistor 20 is turned off, the reflected signal $V_S$ starts to rise. A settling time $T_D$ of the reflected signal $V_S$ is determined by the frequency $f_A$.

FIG. 2 illustrates waveforms of the switching signal $S_W$ and the reflected signal $V_S$ in the conventional primary-side controlled power converter of FIG. 1. After the reflected signal $V_S$ has been filtered by the low-pass filter, the rising time and the settling time $T_D$ thereof are prolonged. The low-pass filter further limits the maximum frequency of the switching signal $S_W$. Therefore, to reduce the settling time $T_D$ and to allow increase of the maximum frequency of the switching signal $S_W$ are desired.

SUMMARY OF THE INVENTION

An object of the present invention is to reduce the settling time $T_D$ and increase the maximum frequency of the switching signal $S_W$.

To achieve the aforementioned object, the present invention provides a primary-side controlled power converter comprising: an RC network coupled to an auxiliary winding of a transformer of the primary-side controlled power converter to detect a reflected voltage of the transformer so as to generate a reflected signal; and a controller coupled to the RC network to receive the reflected signal so as to generate a switching signal; wherein the RC network develops a zero to provide a high-frequency path so as to shorten a rising time and a settling time of the reflected signal.

The foregoing RC network comprises: a first resistor having a first terminal and a second terminal, the first terminal of the first resistor being coupled to the auxiliary winding of the transformer to detect the reflected voltage of the transformer; a third resistor having a first terminal and a second terminal, the first terminal of the third resistor being connected to the second terminal of the first resistor; a second resistor connected to the second terminal of the third resistor and ground; a first capacitor connected to the first resistor in parallel; and a second capacitor connected to the second resistor in parallel.

To achieve the foregoing object, the present invention further provides a method for detecting a reflected voltage of a transformer of a primary-side controlled power converter, comprising: coupling an RC network to an auxiliary winding of the transformer of the primary-side controlled power converter, wherein the RC network develops a zero to provide a high-frequency path; receiving a reflected signal generated by the RC network; and generating a switching signal based on the reflected signal.

DETAILED DESCRIPTION OF THE INVENTION

Figure 3:
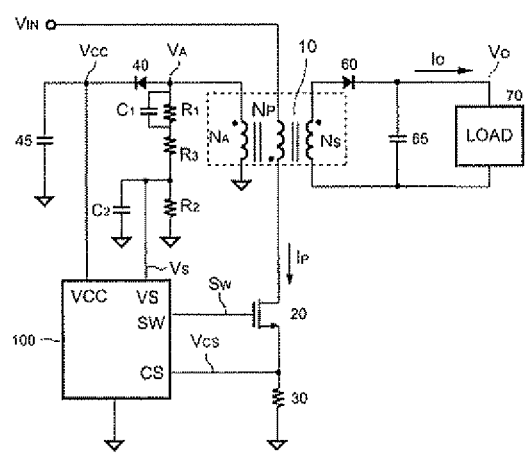
FIG. 3 illustrates a circuit diagram of a primary-side controlled power converter according to one embodiment of the present invention.

FIG. 3 is a circuit diagram of a primary-side controlled power converter according to one embodiment of the present invention. The primary-side controlled power converter comprises a transformer 10 including a primary winding $N_P$, a secondary winding $N_S$ and an auxiliary winding $N_A$. One terminal of the primary winding $N_P$ receives an input voltage $V_{IN}$. The other terminal of the primary winding $N_P$ is coupled to a drain terminal of a power transistor 20. An anode of an output rectifier 60 is coupled to one terminal of the secondary winding $N_S$. One terminal of an output capacitor 65 is connected to a cathode of the output rectifier 60. The other terminal of the output capacitor 65 is connected to the other terminal of the secondary winding $N_S$. An output current $I_O$ flows through an output load 70 connected to the output capacitor 65 in parallel. An output voltage $V_O$ is generated at one terminal of the output capacitor 65. An anode of a rectifier 40 is coupled to the auxiliary winding $N_A$. One terminal of a storage capacitor 45 is connected to a cathode of the rectifier 40. The other terminal of the storage capacitor 45 is connected to ground. A supply voltage $V_{CC}$ is generated at a join of the storage capacitor 45 and the cathode of the rectifier 40.

The primary-side controlled power converter comprises an RC network coupled to the auxiliary winding $N_A$ of the transformer 10 to detect a reflected voltage $V_A$ of the transformer so as to generate a reflected signal $V_S$ and a controller 100 coupled to the RC network to receive the reflected signal $V_S$ so as to generate a switching signal $S_W$. An RC network includes a first resistor $R_1$, a second resistor $R_2$, a third resistor $R_3$, a high-pass capacitor $C_1$, and a low-pass capacitor $C_2$. A first terminal of the first resistor $R_1$ is coupled to the auxiliary winding $N_A$ of the transformer 10 of the primary-side controlled power converter to detect the reflected voltage $V_A$ of the transformer 10. A first terminal of the third resistor $R_3$ is connected to a second terminal of the first resistor $R_1$. A first terminal of the second resistor $R_2$ is connected to a second terminal of the third resistor $R_3$, and the second terminal of the second resistor $R_2$ is connected to ground.

A first terminal of the high-pass capacitor $C_1$ is coupled to the auxiliary winding $N_A$ of the transformer 10 and the first terminal of the first resistor $R_1$. A second terminal of the high-pass capacitor $C_1$ is connected to the second terminal of the first resistor $R_1$. In other words, the high-pass capacitor $C_1$ is connected to the first resistor $R_1$ in parallel. A first terminal of the low-pass capacitor $C_2$ is coupled to the second terminal of the third resistor $R_3$, and the second terminal of the second resistor $R_2$. A second terminal of the low-pass capacitor $C_2$ is connected to ground. In other words, the low-pass capacitor $C_2$ is connected to the second resistor $R_2$ in parallel. The second terminal of the low-pass capacitor $C_2$, the second terminal of the third resistor $R_3$, and the first terminal of the second resistor $R_2$ are further connected to a terminal VS of the controller 100. The reflected signal $V_S$ is generated at the terminal VS of the controller 100. The switching signal $S_W$ is generated at an output terminal SW of the controller 100 and used to control the power transistor 20. A primary-side switching current $I_P$ is generated when the power transistor 20 is turned on and the switching signal $S_W$ is during an on-time period. A current-sense signal $V_{CS}$ is generated at a join of a current-sense terminal CS of the controller 100, one terminal of a current-sense resistor 30, and a source of the power transistor 20 in response to the primary-side switching current $I_P$. The other terminal of the current-sense resistor 30 is connected to ground. The supply voltage $V_{CC}$ is generated at a supply terminal VCC of the controller 100.

The Laplace transform of the transfer function of the reflected signal $V_S$ and the reflected voltage $V_A$ can be expressed as follows:

$$\frac{V_S}{V_A} = \frac{\frac{R_2}{1+SR_2C_2}}{R_3 + \frac{R_1}{1+SR_1C_1} + \frac{R_2}{1+SR_2C_2}} \quad (4)$$

$$= \frac{R_2(1+SR_1C_1)}{R_3(1+SR_1C_1)(1+SR_2C_2) + R_1(1+SR_2C_2)R_2(1+SR_1C_1)}$$

$$= \frac{R_2}{R_3+R_2+R_1} \times \frac{(1+SR_1C_1)}{\left[\left(S^2\frac{R_1R_2R_3}{R_3+R_2+R_1}C_1C_2\right) + S\left(\frac{R_3R_1C_1+R_3R_2C_2+R_1R_2C_2+R_2R_1C_1}{R_3+R_2+R_1}\right) + \frac{R_3+R_2+R_1}{R_3+R_2+R_1}\right]}$$

$$= \frac{R_2}{R_3+R_2+R_1} \times \frac{(1+SR_1C_1)}{S^2\left(\frac{R_3R_2R_1}{R_3+R_2+R_1}C_2C_1\right) + S\left(\frac{R_3R_1C_1+R_3R_2C_2+R_2R_1C_2+R_2R_1C_1}{R_3+R_2+R_1}\right) + 1}$$

$$\frac{V_S}{V_A} = \frac{R_2}{R_3+R_2+R_1} \times \frac{1+j\left(\frac{f}{f_1}\right)}{\left[1+j\left(\frac{f}{f_X}\right)\right] \times \left[1+j\left(\frac{f}{f_Y}\right)\right]} \quad (5)$$

$$f_1 = \frac{1}{2\pi \times R_1 \times C_1} \quad (6)$$

Figure 1:
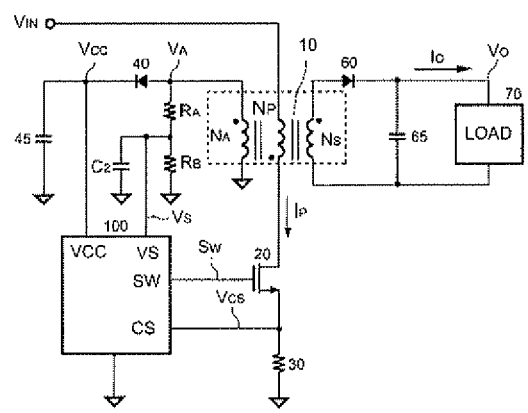
FIG. 1 illustrates a circuit diagram of a conventional primary-side controlled power converter.
Figure 2:
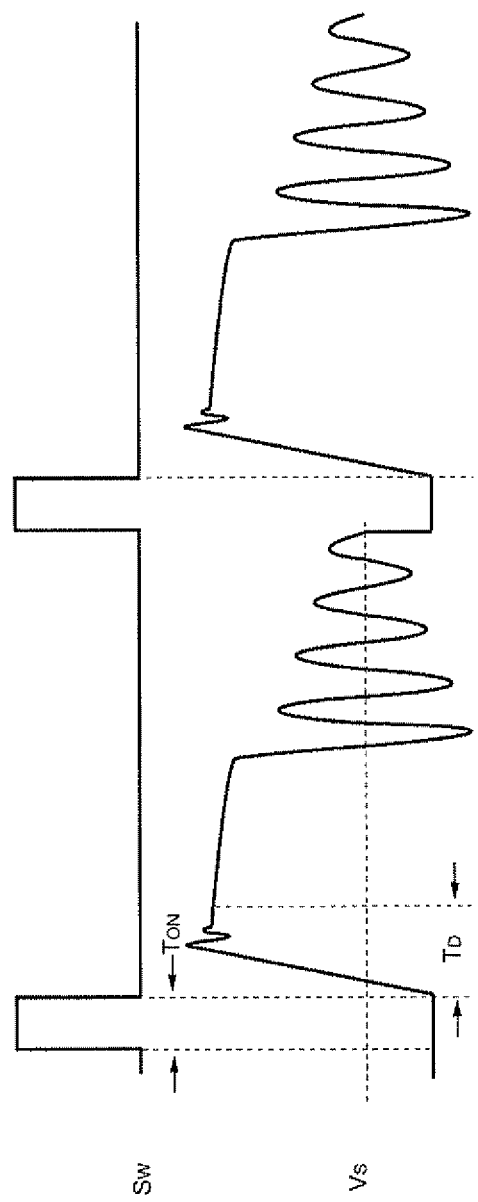
FIG. 2 illustrates waveforms of the switching signal and the reflected signal in the conventional primary-side controlled power converter of FIG. 1.
Figure 4:
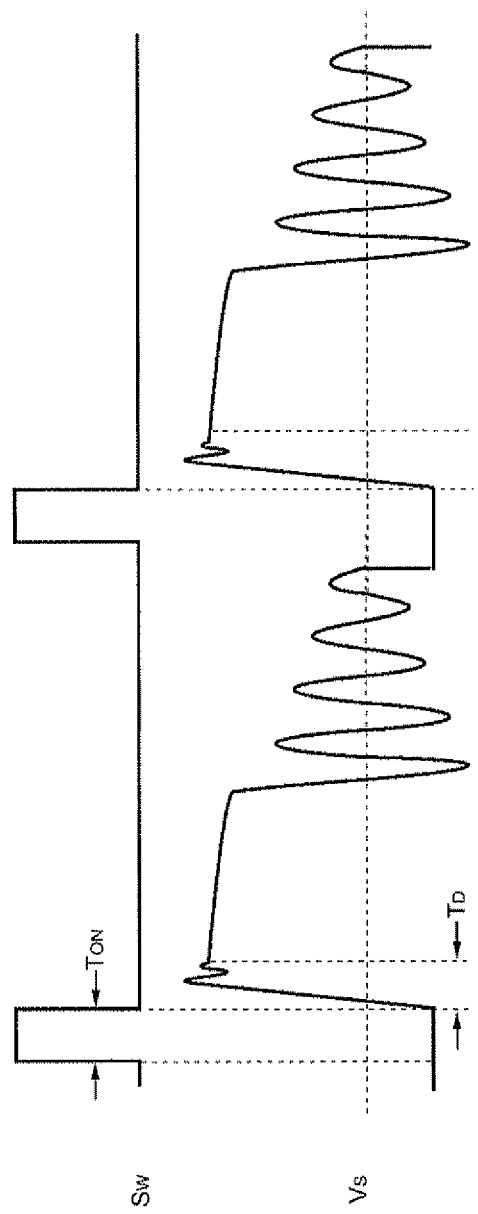
FIG. 4 illustrates waveforms of the switching signal and the reflected signal according to one embodiment of the present invention.

The transfer function of the reflected signal $V_S$ and the reflected voltage $V_A$ can be simplified as the formula (5), where a first frequency $f_1$ is a zero; a second frequency $f_X$ and a third frequency $f_Y$ are poles. The zero is determined by the first resistor $R_1$ and the high-pass capacitor $C_1$, which provides a high-frequency path so as to shorten the rising time and the settling time $T_D$ of the reflected voltage $V_A$. The waveforms of the switching signal $S_W$ and the reflected signal $V_S$ are shown in FIG. 4. Compared to FIG. 2, the rising time and the settling time $T_D$ of the reflected signal $V_S$ have been shortened and the rising edge of the reflected signal $V_S$ has a sharper gradient.

Figure 5:
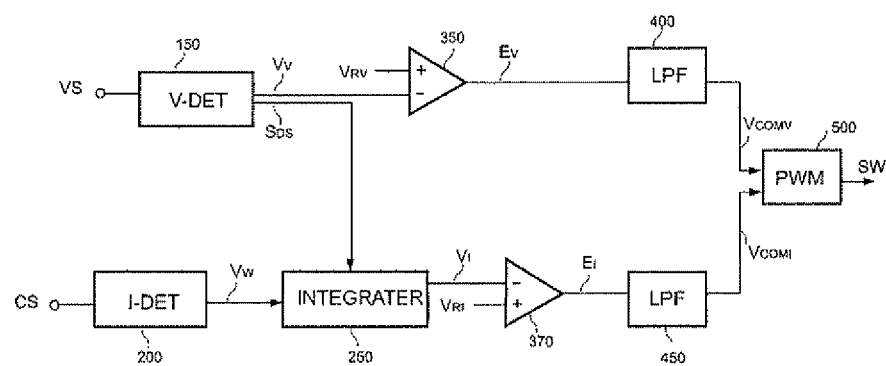
FIG. 5 illustrates a circuit diagram of a controller according to one embodiment of the present invention.

FIG. 5 illustrates a preferred embodiment of the controller 100 for the primary-side controlled power converter. The detailed description of the primary-side controlled power converter can be found in the following references: U.S. Pat. No. 6,977,824, entitled "Control circuit for controlling output current at the primary side of a power converter"; U.S. Pat. No. 7,016,204, entitled "Close-loop PWM controller for primary-side controlled power converters"; U.S. Pat. No. 7,349,229, entitled "Causal sampling circuit for measuring reflected voltage and demagnetizing time of transformer"; U.S. Pat.

No. 7,486,528, entitled "Linear-predict sampling for measuring demagnetized voltage of transformer".

The controller 100 comprises a voltage-detection circuit 150, a current-detection circuit 200, an integrator 250, amplifiers 350 and 370, low-pass filters 400 and 450, and a PWM circuit 500. The voltage-detection circuit 150 receives the reflected signal $V_S$ at the terminal VS to generate a voltage-feedback signal $V_V$ and a discharge-time signal $S_{DS}$. A first reference signal $V_{RV}$ is applied to a positive input of the amplifier 350 and the voltage-feedback signal $V_V$ is applied to a negative input of the amplifier 350. The amplifier 350 can be implemented as an error amplifier according to one embodiment of the present invention. By comparing the voltage-feedback signal $V_V$ with the reference signal $V_{RV}$, the amplifier 350 amplifies the voltage-feedback signal $V_V$ and outputs an amplified signal $E_V$ for providing a voltage loop of the controller 100. The amplified signal $E_V$ is received by the low-pass filter 400 to generate a voltage-loop signal $V_{COMV}$ for the frequency compensation of the voltage loop.

The current-detection circuit 200 is coupled to the current-sense resistor 30 and the power transistor 20 (shown in FIG. 3) to receive the current-sense signal $V_{CS}$ so as to generate a current-waveform signal $V_W$. The current-sense signal $V_{CS}$ is generated at the current-sense terminal CS of the controller 100. The integrator 250 is coupled to the current-detection circuit 200 and the voltage-detection circuit 150 so as to generate a current-feedback signal $V_I$ based on the current-waveform signal $V_W$ and the discharge-time signal $S_{DS}$. The current-waveform signal $V_W$ is generated by measuring the primary-side switching current $I_P$. The current-feedback signal $V_I$ is generated by integrating the current-waveform signal $V_W$ with the discharge-time signal $S_{DS}$. A second reference current signal $V_{RI}$ is applied to the positive terminal of the amplifier 370. The current-feedback signal $V_I$ is further applied to a negative input of the amplifier 370. By comparing the current-feedback signal $V_I$ and the second reference current signal $V_{RI}$, the amplifier 370 amplifies the current-feedback signal $V_I$ and generates an amplified signal $E_I$ for providing a current loop of the controller 100. The amplified signal $E_I$ is received by the low-pass filter 450 to generate a current-loop signal $V_{COMI}$ for the frequency compensation of the current loop. The PWM circuit 500 generates the switching signal $S_W$ and controls a pulse width of the switching signal $S_W$ responding to the voltage-loop signal $V_{COMV}$ and the current-loop signal $V_{COMI}$. Hence, the controller 100 is coupled to the RC network to receive the reflected signal $V_S$ for generating the switching signal $S_W$.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A primary-side controlled power converter, comprising:
   an RC network coupled to an auxiliary winding of a transformer of the primary-side controlled power converter to detect a reflected voltage of the transformer to generate a reflected signal; and
   a controller coupled to the RC network to receive the reflected signal and generate a switching signal;
   wherein the RC network comprises a high-pass filter coupled to the auxiliary winding to detect the reflected voltage; and
   wherein the high-pass filter develops a zero to provide a high-frequency path to shorten a rising time and a settling time of the reflected signal.

2. The power converter as claimed in claim 1, wherein the RC network comprises:
   a first resistor coupled to the auxiliary winding to detect the reflected voltage of the transformer;
   a third resistor serially connected with the first resistor;
   a second resistor connected from the third resistor to ground;
   a high-pass capacitor parallel connected to the first resistor;
   a low-pass capacitor parallel connected to the second resistor;
   wherein the controller is coupled to a join of the second resistor and the low-pass capacitor.

3. The power converter as claimed in claim 2, wherein the first resistor has a first terminal and a second terminal, the first terminal of the first resistor being coupled to the auxiliary winding of the transformer; the third resistor has a first terminal and a second terminal, the first terminal of the third resistor being connected to the second terminal of the first resistor.

4. The power converter as claimed in claim 1, wherein the controller generates the switching signal according to the reflected voltage for regulating an output voltage of the power converter.

5. The power converter as claimed in claim 1, wherein the controller generates the switching signal according to the reflected voltage for regulating an output current of the power converter.

6. A primary-side controlled power converter with a network, comprising:
   a network including a high-pass filter coupled to an auxiliary winding of a transformer of the primary-side controlled power converter to detect a reflected voltage of the transformer, said network further including:
   a resistor coupled to the auxiliary winding to detect the reflected voltage of the transformer; and
   a high-pass capacitor connected to the resistor in parallel; and
   a controller coupled to the resistor to receive the reflected voltage;
   wherein the high-pass filter including the resistor and the resistor and the high-pass capacitor develops a zero of the network, and the controller generates a switching signal according to the reflected voltage.

7. The power converter as claimed in claim 6, wherein a reflected signal is generated at a join of the network and the controller, and the resistor and the high-pass capacitor provide a high-frequency path of the network to shorten a rising time and a settling time of the reflected signal.

8. The power converter as claimed in claim 6, wherein the controller generates the switching signal according to the reflected voltage for regulating an output voltage of the power converter.

9. The power converter as claimed in claim 6, wherein the controller generates the switching signal according to the reflected voltage for regulating an output current of the power converter.

10. A method for detecting a reflected voltage of a transformer of a primary-side controlled power converter, comprising:
- coupling an RC network between an auxiliary winding of the transformer of the primary-side controlled power converter and a controller, wherein the RC network comprises a high-pass filter coupled to the auxiliary winding to detect the reflected voltage and develops a zero to provide a high-frequency path;
- receiving a reflected signal generated at a join of the RC network and the controller;
- generating a switching signal according to the reflected signal through the controller.

11. The method as claimed in claim 10, the RC network comprises:
- a first resistor coupled to the auxiliary winding;
  - a third resistor serially connected with the first resistor;
  - a second resistor connected from the third resistor to ground;
  - a high-pass capacitor parallel connected to the first resistor;
  - a low-pass capacitor parallel connected to the second resistor;
  - wherein the controller is coupled to a join of the second resistor and low-pass capacitor.

\* \* \* \* \*